United States Patent
Izumi et al.

(10) Patent No.: US 10,459,359 B2
(45) Date of Patent: Oct. 29, 2019

(54) TONER BINDER AND TONER

(71) Applicant: SANYO CHEMICAL INDUSTRIES, LTD., Kyoto (JP)

(72) Inventors: Tsuyoshi Izumi, Kyoto (JP); Masaru Honda, Kyoto (JP)

(73) Assignee: SANYO CHEMICAL INDUSTRIES, LTD., Kyoto (JP)

( * ) Notice: Subject to any disclaimer, the term of this patent is extended or adjusted under 35 U.S.C. 154(b) by 0 days.

(21) Appl. No.: 15/778,914

(22) PCT Filed: Nov. 25, 2016

(86) PCT No.: PCT/JP2016/084887
§ 371 (c)(1),
(2) Date: May 24, 2018

(87) PCT Pub. No.: WO2017/090701
PCT Pub. Date: Jun. 1, 2017

(65) Prior Publication Data
US 2019/0250529 A1    Aug. 15, 2019

(30) Foreign Application Priority Data

Nov. 27, 2015 (JP) .................................. 2015-231349

(51) Int. Cl.
| | |
|---|---|
| G03G 9/08 | (2006.01) |
| G03G 9/087 | (2006.01) |
| C08G 63/12 | (2006.01) |
| C08G 63/21 | (2006.01) |
| C08G 63/52 | (2006.01) |
| C08G 63/676 | (2006.01) |
| C08L 67/02 | (2006.01) |
| C08G 63/54 | (2006.01) |
| C08G 63/547 | (2006.01) |
| C08G 63/85 | (2006.01) |

(52) U.S. Cl.
CPC ......... *G03G 9/08755* (2013.01); *C08G 63/12* (2013.01); *C08G 63/21* (2013.01); *C08G 63/52* (2013.01); *C08G 63/54* (2013.01); *C08G 63/547* (2013.01); *C08G 63/676* (2013.01); *C08G 63/85* (2013.01); *C08L 67/02* (2013.01); *G03G 9/08793* (2013.01); *G03G 9/08795* (2013.01); *G03G 9/08797* (2013.01)

(58) Field of Classification Search
CPC ... G03G 9/08755; C08G 63/54; C08G 63/547
USPC ...................................... 430/109.4
See application file for complete search history.

(56) References Cited

U.S. PATENT DOCUMENTS

| | | | |
|---|---|---|---|
| 2009/0269691 A1 | 10/2009 | Yamato et al. | |
| 2012/0237868 A1* | 9/2012 | Yamada ............... | G03G 9/0821 430/108.21 |

FOREIGN PATENT DOCUMENTS

| | | |
|---|---|---|
| JP | 04-211272 | 8/1992 |
| JP | 2002-107993 | 4/2002 |
| JP | 2006-154625 | 6/2006 |
| JP | 2009-222997 | 10/2009 |
| JP | 2012-063485 | 3/2012 |
| JP | 2012-155091 | 8/2012 |
| WO | 2007/034813 | 3/2007 |

OTHER PUBLICATIONS

International Search Report dated Feb. 28, 2017 in International (PCT) Application No. PCT/JP2016/084887.

* cited by examiner

*Primary Examiner* — Mark A Chapman
(74) *Attorney, Agent, or Firm* — Wenderoth, Lind & Ponack, L.L.P.

(57) ABSTRACT

An object of the present invention is to provide a toner binder and a toner that maintains offset resistance while having high gloss and that is excellent in low-temperature fixability, grindability, image strength, and heat-resistant storage stability. The toner binder of the present invention is a toner binder containing a non-linear polyester modified resin (A), wherein the non-linear polyester modified resin (A) is a modified resin having one or more carbon-carbon bonds crosslinking polyesters, and the toner binder has a loss tangent tan δ of 2 to 20 in the entire temperature range of 110° C. to 130° C.

15 Claims, No Drawings

TONER BINDER AND TONER

TECHNICAL FIELD

The present invention relates to a toner and a toner binder for developing electrostatic images or magnetic latent images by methods such as an electrographic method, an electrostatic recording method, or an electrostatic printing method. More specifically, the present invention relates to a toner and a toner binder for developing electrostatic images or magnetic latent images, particularly suitable for full color images.

BACKGROUND ART

Recent advancement in electrophotographic systems has brought a rapid increase in the demand for electrophotographic devices such as copy machines and laser printers and has also created the need for higher performance of these devices.

According to conventionally known methods and devices for full color electrophotographic images, an image is obtained by forming a latent image based on color image information on a latent image carrier such as an electrophotographic photoreceptor; forming a toner image using color toners corresponding to the colors of the latent image; and transferring the toner image to a transfer material. This image formation process is performed repeatedly. Then, the toner image on the transfer material is thermally fixed to produce a multicolor image.

For these processes to run smoothly, it is firstly required that the toner maintains a stable electrostatic charge level, and it is secondly required that the toner has good fixability to paper. In addition, the devices include heating elements in their fixing sections, and these heating elements raise the temperature in the devices. Thus, it is also required that the toner does not undergo blocking in the devices.

Further, there is a demand for further miniaturization, higher operation speed, and better image quality performance of electrophotographic devices, and to reduce the amount of energy consumption in a fixing step. Thus, there is a strong demand for improving low-temperature fixability of the toner in order to save energy.

In addition, recently used transfer materials include various types of paper including recycled paper with a rough surface and coated paper with a smooth surface. In order to handle surface properties of these transfer materials, fixing devices with a large nip width, such as soft rollers and belt rollers, are preferably used. However, a larger nip width results in an increased contact area between the toner and fixing rollers. This causes so-called "high-temperature offset phenomenon" in which the fused toner is attached to the fixing rollers. Thus, offset resistance is a prerequisite.

In addition to the above, much higher gloss is required for multicolor images (full color images) than black-and-white images (monochrome images) due to processes such as reproduction of images such as photos. It is necessary to ensure that the resultant multicolor images have a smooth toner layer.

Thus, in forming a toner image, a toner is required to exert low-temperature fixability and offset resistance. Also, a formed toner image is required to exhibit high gloss. In addition, the demand is increasing for a highly glossy toner image that can be obtained in a wider working range.

Toner binders have a great influence on toner properties as mentioned above. While known resins for toner binders include polystyrene resin, styrene-acrylic resin, polyester resin, epoxy resin, polyurethane resin, and polyamide resin. Polyester resin has recently attracted particular attention because the balance between storage stability and fixability can be easily achieved with the polyester resin.

Patent Literature 1 suggests a toner containing a reaction product of a mixture of a resin for producing macromolecules, a polyester resin and an isocyanate.

However, even if this method can prevent the high-temperature offset phenomenon to some extent, it is difficult to achieve low-temperature fixation because the lower limit fixation temperature is also raised simultaneously. In addition, since a urea group and a urethane group derived from isocyanate are highly cohesive, the resin has very poor grindability. The resin also has poor homogeneity and poor heat-resistant storage stability. Thus, with regard to color toners, the demand for higher operation speed and lower energy consumption has not been fully met.

Patent Literature 2 suggests a toner containing a product obtained by crosslinking an unsaturated double bond-containing polyester resin using a radical reaction initiator.

However, while the grindability of the resin is improved by the technique disclosed therein, the glossiness is insufficient. Thus, the demand for higher image quality, higher operation speed, and lower energy consumption has not been fully met.

A smooth toner layer is required to provide a highly glossy image. One of known physical properties that control the smoothness of the toner layer is the loss tangent tan δ (G"/G') represented as the ratio of storage modulus (G') to loss modulus (G") of dynamic viscoelasticity of a binder used in the toner.

In order to provide a color toner for improving glossiness, Patent Literature 3 suggests a method for controlling the loss tangent tan δ using a hybrid resin including a polyester unit and a vinyl-based copolymer unit. While this method provides excellent glossiness and fixability, the image strength of images obtained by fixing the toner is insufficient.

As described above, conventional techniques have not been able to provide toner binders or toners applicable to full color images, which exhibits offset resistance and can provide high gloss for a toner image, and which are excellent in low-temperature fixability, grindability, image strength, and heat-resistant storage stability.

CITATION LIST

Patent Literature

Patent Literature 1: JP H04-211272 A
Patent Literature 2: JP 2006-154625 A
Patent Literature 3: JP 2009-222997 A

SUMMARY OF INVENTION

Technical Problem

The present invention aims to provide a toner binder and a toner which exhibit offset resistance and can provide high gloss for a toner image, and which are excellent in low-temperature fixability, grindability, image strength, and heat-resistant storage stability.

Solution to Problem

As a result of extensive examinations to solve the problems, the present inventors arrived at the present invention.

Specifically, the present invention relates to a toner binder containing: a non-linear polyester modified resin (A), wherein the non-linear polyester modified resin (A) is a modified resin having one or more carbon-carbon bonds crosslinking polyesters, and the toner binder has a loss tangent tan δ of 2 to 20 in the entire temperature range of 110° C. to 130° C. The present invention also relates to a toner containing the toner binder and a colorant.

Advantageous Effects of Invention

According to the present invention, it is possible to provide a toner binder and a toner that exhibits offset resistance and can provide high gloss for a toner image, and that is excellent in low-temperature fixability, grindability, image strength, and heat-resistant storage stability. In addition to the above properties, the toner of the present invention is also excellent in flowability, electrostatic charge stability, folding resistance, and document offset resistance.

SUMMARY OF INVENTION

The toner binder of the present invention is a toner binder containing non-linear polyester modified resin (A), wherein the non-linear polyester modified resin (A) is a modified resin having one or more carbon-carbon bonds crosslinking polyesters, and the toner binder has a loss tangent tan δ of 2 to 20 in the entire temperature range of 110° C. to 130° C.

The toner binder of the present invention is detailed below.

The toner binder of the present invention contains, as an essentially component, the non-linear polyester modified resin (A) having one or more carbon-carbon bonds crosslinking polyesters.

The polyester as used herein is not particularly limited, and may be any polyester that can be crosslinked to form carbon-carbon bonds. Examples thereof include a polyester (A1) having carbon-carbon double bonds and a polyester (A2) having intermolecular carbon-carbon bonds formed by hydrogen radical abstraction in molecules on the main chain. In terms of easiness in forming a crosslinking structure, the polyester (A1) having carbon-carbon double bonds is preferred.

In addition, at least one of the carbon-carbon bonds of the non-linear polyester modified resin (A) is preferably a carbon-carbon bond formed by mutually crosslinking carbon-carbon double bonds derived from the polyester (A1) having carbon-carbon double bonds.

In addition, the non-linear polyester modified resin (A) may consist of only one kind of polyester modified resin. The non-linear polyester modified resin (A) may also be a mixture of two or more kinds of polyester modified resins. For example, it may be a mixture of the non-linear polyester modified resin (A) and a polyester (B) (described later) other than the non-linear polyester modified resin (A).

In addition, in the toner binder of the present invention, the polyester (A1) having carbon-carbon double bonds preferably contains an unsaturated carboxylic acid component (y) and/or an unsaturated alcohol component (z) as a raw material.

Further, the polyester (A1) having carbon-carbon double bonds may contain a saturated alcohol component (x) and a saturated carboxylic acid component (w) as raw materials, in addition to the unsaturated carboxylic acid component (y) and the unsaturated alcohol component (z).

These components each may be a polycondensation product of a single kind of components or a polycondensation product of several kinds of components.

As used herein, a bond to an aromatic ring is not taken into consideration in determining whether a compound is the unsaturated carboxylic acid component (y) or the saturated carboxylic acid component (w). Specifically, an aromatic ring-containing compound that is an unsaturated carboxylic acid except for the aromatic ring is determined to be the unsaturated carboxylic acid component (y); and an aromatic ring-containing compound that is a saturated carboxylic acid except for the aromatic ring is determined to be the saturated carboxylic acid component (w).

Likewise, a bond to an aromatic ring bond is not taken into consideration in determining whether a compound is the unsaturated alcohol component (z) or the saturated alcohol component (x). Specifically, an aromatic ring-containing compound that is an unsaturated alcohol except for the aromatic ring is determined to be the unsaturated alcohol component (z); and an aromatic ring-containing compound that is a saturated alcohol except for the aromatic ring is determined to be the saturated alcohol component (x).

The polyester (A2) having intermolecular carbon-carbon bonds formed by hydrogen radical abstraction in molecules on the main chain may be derived from polyesters containing the saturated carboxylic acid component (w) and/or the unsaturated carboxylic acid component (y) and the saturated alcohol component (x) and/or the unsaturated alcohol component (z) as raw materials. The intermolecular carbon-carbon bonds may be formed by hydrogen radical abstraction in molecules on the main chain of the polyesters mentioned above.

Examples of the unsaturated alcohol component (z) include an unsaturated monoalcohol (z1) and an unsaturated diol (z2).

Examples of the unsaturated monoalcohol (z1) include C2-C30 unsaturated monoalcohols. Specific examples thereof include 2-propen-1-ol, oleyl alcohol, and 2-hydroxyethyl methacrylate.

Examples of the unsaturated diol (z2) include C2-C30 unsaturated diols. Specific examples thereof include ricinoleyl alcohol.

Examples of the saturated alcohol component (x) include monools (x1), diols (x2), and tri- to octa- or higher hydric polyols (x3).

Examples of the monools (x1) include C1-C30 alkanols (e.g., methanol, ethanol, isopropanol, dodecyl alcohol, myristyl alcohol, cetyl alcohol, stearyl alcohol, and behenyl alcohol). Preferred among these monools are C8-C24 alkanols, and more preferred are dodecyl alcohol, myristyl alcohol, stearyl alcohol, and behenyl alcohol.

These may be used alone or in combination of two or more thereof.

Examples of the diols (x2) include C2-C36 alkylene glycols (e.g., ethylene glycol, 1,2-propylene glycol, 1,3-propylene glycol, 1,4-butanediol, neopentyl glycol, 1,6-hexane diol, 1,9-nonane diol, 1,10-decane diol, and 1,12-dodecane diol) (x21);

C4-C36 alkylene ether glycols (e.g., diethylene glycol, triethylene glycol, dipropylene glycol, polyethylene glycol, polypropylene glycol, and polytetramethylene ether glycol) (x22);

C6-C36 alicyclic diols (e.g., 1,4-cyclohexane dimethanol and hydrogenated bisphenol A) (x23);

(poly)oxyalkylene ethers of the above-mentioned alicyclic diols (x24), which include 1 to 30 oxyalkylene unit(s) (hereinafter abbreviated as "AO unit(s)"), wherein the oxyalkylene groups may be constituted by C2-C4 alkylene group, and the oxyalkylene may be, for example, oxyethylene and oxypropylene; and polyoxyalkylene ethers of dihydric phenols such as monocyclic dihydric phenols (e.g., hydroquinone) or bisphenols (AO unit number: 2 to 30) (x25).

Preferred among these diols (x2) are polyoxyalkylene ethers of bisphenols in terms of low-temperature fixability and heat-resistant storage stability.

Polyoxyalkylene ethers of bisphenols are usually obtained by adding alkylene oxides (hereinafter the "alkylene oxide" may be abbreviated as "AO") to bisphenols. Examples of the bisphenols include one represented by formula (1) below.

$$OH-Ar-X-Ar-OH \quad (1)$$

wherein X represents a C1-C3 alkylene group, —SO$_2$—, —O—, —S—, or a direct bond; and Ar represents a phenylene group optionally substituted with a halogen atom or a C1-C30 alkyl group.

Specific examples of the bisphenols include bisphenol A, bisphenol F, bisphenol B, bisphenol AD, bisphenol S, trichlorobisphenol A, tetrachlorobisphenol A, dibromobisphenol F, 2-methyl bisphenol A, 2,6-dimethyl bisphenol A, and 2,2'-diethyl bisphenol F. They may be used in combination of two or more thereof.

As the alkylene oxides to be added to such bisphenols, C2-C4 alkylene oxides are preferred, and specific examples thereof include ethylene oxide (hereinafter the "ethylene oxide" may be abbreviated as "EO"), propylene oxide (hereinafter the "propylene oxide" may be abbreviated as "PO"), 1,2-, 2,3-, 1,3- or iso-butylene oxide, tetrahydrofuran, and combinations of two or more thereof.

Preferred among these are EO and/or PO.

The addition molar number of AO is preferably 2 to 30 moles, more preferably 2 to 10 moles.

Preferred among these polyoxyalkylene ethers of bisphenols are EO and/or PO adducts of bisphenol A (average addition molar number: 2 to 4, particularly, 2 to 3) in terms of fixability of the toner.

Examples of the tri- to octa- or higher hydric polyols (x3) include C3-C36 tri- to octa- or higher hydric aliphatic polyols (x31), saccharides and derivatives thereof (x32), (poly)oxyalkylene ethers of aliphatic polyols (AO unit number: 1 to 30) (x33), polyoxyalkylene ethers of trisphenols (e.g., trisphenol PA) (AO unit number: 2 to 30) (x34), and polyoxyalkylene ethers of novolac resins (e.g., phenol novolac and cresol novolac; average degree of polymerization: 3 to 60) (AO unit number: 2 to 30) (x35).

Examples of the C3-C36 tri- to octa- or higher hydric aliphatic polyols (x31) include alkane polyols and intramolecular or intermolecular dehydrated products thereof. More specific examples thereof include glycerol, trimethylolethane, trimethylolpropane, pentaerythritol, sorbitol, sorbitan, polyglycerol, and dipentaerythritol.

Examples of the saccharides and derivatives thereof (x32) include sucrose and methyl glucoside.

Preferred among the saturated alcohol components (x) are C2-C36 alkylene glycols (x21), polyoxyalkylene ethers of bisphenols (AO unit number: 2 to 30) (x25), C3-C36 tri- to octa- or higher hydric aliphatic polyols (x31), and polyoxyalkylene ethers of novolac resin (AO unit number: 2 to 30) (x35), in terms of low-temperature fixability and hot offset resistance in a balanced manner.

In terms of storage stability, more preferred are C2-C10 alkylene glycols, polyoxyalkylene ethers of bisphenols (AO unit number: 2 to 5), and polyoxyalkylene ethers of novolac resin (AO unit number: 2 to 30).

Particularly preferred are C2-C6 alkylene glycols and polyoxyalkylene ethers of bisphenol A (AO unit number: 2 to 5); and the most preferred are ethylene glycol, propylene glycol, and polyoxyalkylene ether of bisphenol A (AO unit number: 2 to 3).

Examples of the unsaturated carboxylic acid component (y) include an unsaturated monocarboxylic acid (y1), an unsaturated dicarboxylic acid (y2), and anhydrides or lower alkyl esters of these acids.

Examples of the unsaturated monocarboxylic acid (y1) include C2-C30 unsaturated monocarboxylic acids. Specific examples thereof include acrylic acid, methacrylic acid, propiolic acid, 2-butyne acid, crotonic acid, isocrotonic acid, 3-butenoic acid, angelic acid, tiglic acid, 4-pentenoic acid, 2-ethyl-2-butenoic acid, 10-undecanoic acid, 2,4-hexadienoic acid, myristoleic acid, palmitoleic acid, sapienic acid, oleic acid, elaidic acid, vaccenic acid, gadoleic acid, erucic acid, and nervonic acid.

Examples of the unsaturated dicarboxylic acid (y2) include C4-C50 alkene dicarboxylic acids. Specific examples thereof include alkenyl succinic acids (such as dodecenyl succinic acid), maleic acid, fumaric acid, citraconic acid, mesaconic acid, itaconic acid, glutaconic acid, and vinyl polymers of unsaturated carboxylic acids [number average molecular weight (hereinafter represented by "Mn", determined by gel permeation chromatography (GPC)): 450 to 10,000] (e.g., α-olefin/maleic acid copolymer).

Preferred among these unsaturated carboxylic acid components (y) in terms of low-temperature fixability and hot offset resistance in a balanced manner are acrylic acid, methacrylic acid, alkenyl succinic acids (e.g., dodecenyl succinic acid), maleic acid, and fumaric acid.

Still more preferred are acrylic acid, methacrylic acid, maleic acid, fumaric acid, and combinations thereof. Alternatively, the unsaturated carboxylic acid components (y) may be anhydrides or lower alkyl esters of these acids.

Examples of the saturated carboxylic acid component (w) include C2-C50 alkane dicarboxylic acids (e.g., oxalic acid, malonic acid, succinic acid, adipic acid, lepargylic acid, and sebacic acid), C8-C36 aromatic dicarboxylic acids (e.g., phthalic acid, isophthalic acid, terephthalic acid, and naphthalene dicarboxylic acid), C9-C20 aromatic polycarboxylic acids (e.g., trimellitic acid and pyromellitic acid), and C6-C36 aliphatic tricarboxylic acids (e.g., hexane tricarboxylic acid).

Alternatively, the saturated carboxylic acid components (w) may be anhydrides or lower alkyl (C1-C4) esters (e.g., methyl ester, ethyl ester, and isopropyl ester) of these carboxylic acids.

Preferred among these saturated carboxylic acid components (w) are C2-C50 alkane dicarboxylic acids, C8-C20 aromatic dicarboxylic acids, and C9-C20 aromatic polycarboxylic acids, in terms of low-temperature fixability and hot offset resistance in a balanced manner.

In terms of storage stability, more preferred are adipic acid, alkyl succinic acid, terephthalic acid, isophthalic acid, trimellitic acid, pyromellitic acid, and combinations thereof. Particularly preferred are adipic acid, terephthalic acid, trimellitic acid, and combinations thereof. Examples of the saturated carboxylic acid components (w) may also include anhydrides or lower alkyl esters of these acids.

In the toner binder of the present invention, the polyester (A1) having carbon-carbon double bonds is not particularly limited, but is preferably non-linear in order to improve the elasticity at high temperatures.

Any method may be used to produce the polyester (A1) in the toner binder of the present invention. Yet, as described above, it is preferred to use at least one kind of the unsaturated carboxylic acid components (y) and/or at least one kind of the unsaturated alcohol component (z) as a raw material. Further, when the polyester (A1) is non-linear, the polyester (A1) may be produced by, for example, a method that uses a tri- or higher hydric polyol as the saturated alcohol component (x) as a raw material, in addition to the unsaturated carboxylic acid component (y) and/or the unsaturated alcohol component (z); or a method that uses a tri- or higher valent carboxylic acid or an acid anhydride or lower alkyl ester thereof as the saturated carboxylic acid component (w). The non-linear polyester (A1) improves the heat-resistant storage stability and the hot offset resistance.

In the present invention, the individual polyesters can be produced in the same manner as common polyester production methods.

For example, these polyesters can be produced by a reaction under an inert gas (e.g., nitrogen gas) atmosphere, preferably at a reaction temperature of 150° C. to 280° C., more preferably 160° C. to 250° C., particularly preferably 170° C. to 235° C. In order to ensure completion of the polycondensation reaction, the reaction time is preferably 30 minutes or more, particularly preferably 2 to 40 hours.

At this time, an esterification catalyst may be used, if necessary.

Examples of the esterification catalyst include tin-containing catalysts (e.g., dibutyl tin oxide), antimony trioxide, titanium-containing catalysts [e.g., titanium alkoxide, potassium oxalate titanate, titanium terephthalate, titanium terephthalate alkoxide, catalysts described in JP 2006-243715 A {e.g., titanium dihydroxy bis(triethanolaminate), titanium monohydroxy tris(triethanolaminate), titanylbis(triethanolaminate), and intramolecular polycondensation products thereof}, and catalysts described in JP 2007-11307 A (e.g., titanium tributoxy terephthalate, titanium triisopropoxy terephthalate, and titanium diisopropoxy diterephthalate)], zirconium-containing catalysts (e.g., zirconium acetate), and zinc acetate. Preferred among these are titanium-containing catalysts. It is also effective to reduce pressure in order to increase the rate of reaction in the last stage of the reaction.

In addition, a stabilizer may be added in order to stabilize the polyester polymerization. Examples of the stabilizer include hydroquinone, methyl hydroquinone, and hindered phenolic compounds.

The feed ratio of the total of the saturated alcohol components (x) and/or the unsaturated alcohol components (z) to the total of the unsaturated carboxylic acid components (y) and/or the saturated carboxylic acid components (w) is preferably 2/1 to 1/2, more preferably 1.5/1 to 1/1.3, particularly preferably 1.4/1 to 1/1.2, as an equivalent ratio [OH]/[COOH] of hydroxyl groups to carboxyl groups.

In the toner binder of the present invention, the polyester (A1) preferably has a glass transition temperature ($Tg_{A1}$) of −35° C. to 45° C.

A Tg of 45° C. or lower results in good low-temperature fixability. A Tg of −35° C. or higher results in good heat-resistant storage stability. The glass transition temperature ($Tg_{A1}$) of the polyester (A1) is more preferably −30° C. to 43° C., particularly preferably −25° C. to 40° C., most preferably −20° C. to 38° C.

The glass transition temperature (Tg) can be measured using, for example, DSC20 SSC/580 available from Seiko Instruments Inc. by the method (DSC method) prescribed in ASTM D3418-82.

In the toner binder of the present invention, the peak top molecular weight Mp of the polyester (A1) is preferably 2,000 to 30,000, still more preferably 3,000 to 20,000, particularly preferably 4,000 to 12,000.

When the peak top molecular weight Mp is 2,000 to 30,000, suitable glossiness, low-temperature fixability, and hot offset resistance are improved.

Now, a calculation method of the peak top molecular weight Mp is described.

First, a calibration curve is produced by gel permeation chromatography (GPC) using standard polystyrene samples.

Next, the samples are separated by GPC, and separated samples in each retention time are counted.

Then, a molecular weight distribution chart is produced from logarithmic values of the calibration curve and the counts. A peak maximum value in the molecular weight distribution chart is the peak top molecular weight Mp.

When there are multiple peaks in the molecular weight distribution chart, the maximum value among these peaks is the peak top molecular weight Mp. Conditions for GPC measurement are as follows.

In the present invention, the peak top molecular weight Mp, the number average molecular weight (hereinafter may be abbreviated as "Mn"), and the weight average molecular weight (hereinafter may be abbreviated as "Mw") of resins such as polyester can be measured by GPC under the following conditions.

Device (an example): HLC-8120 available from Tosoh Corporation

Column (an example): TSK GEL GMH6, two columns [available from Tosoh Corporation]

Measurement temperature: 40° C.

Sample solution: THF solution (0.25% by weight)

Amount of solution to be injected: 100 μL

Detection device: refractive index detector

Reference material: standard polystyrene available from Tosoh Corporation (TSK standard polystyrene), 12 samples (molecular weight: 500, 1,050, 2,800, 5,970, 9,100, 18,100, 37,900, 96,400, 190,000, 355,000, 1,090,000, and 2,890,000)

For measurement of the molecular weight, each sample is dissolved in THF to a concentration of 0.25% by weight, and insolubles are filtered by a glass filter to obtain a sample solution.

Here, the "non-linear" polyester modified resin (A) is a polyester resin having branches (crosslinking points) in the main chain.

Specifically, it is a polyester resin that can be obtained by a crosslinking reaction. The crosslinking reaction may be carried out in any manner. Examples of the crosslinking reaction include a reaction in which unsaturated doubles bonds are introduced into the main chain or a side chain of a polyester resin, and reacted by a radical addition reaction, a cationic addition reaction, or an anionic addition reaction, thus forming intermolecular carbon-carbon bonds.

Examples of the crosslinking reaction also include a reaction that forms ester linkages by a condensation reaction of a tri- to hexa- or higher valent polycarboxylic acid (z2) with the tri- to hexa- or higher valent polyol (x3) during synthesis of a polyester resin.

Examples of the crosslinking reaction still also include a polyaddition reaction of a polyester resin with a compound having multiple epoxy groups, multiple isocyanate groups, multiple carbodiimide groups, multiple aziridine groups, or multiple oxazoline groups.

Preferred among these methods is a reaction that forms intermolecular carbon-carbon bonds by, for example, a radical addition reaction, a cationic addition reaction, or an anionic addition reaction, in terms of grindability and low-temperature fixability.

Specifically, carbon-carbon bonds may be formed by a method in which a crosslinking reaction is carried out between carbon-carbon double bonds derived from the polyesters (A1) having carbon-carbon double bonds to effect at least partial crosslinking.

The non-linear polyester modified resin (A) may be produced by a method described below, for example.

First, the saturated alcohol component (x) and/or the unsaturated alcohol component (z), and the unsaturated carboxylic acid component (y) as raw materials are subjected to a condensation reaction to obtain the polyesters (A1) having carbon-carbon double bonds in the molecule. Next, radicals are generated from a radical reaction initiator (c) by reacting the radical reaction initiator (c) and the polyesters (A1). Using radicals, the polyesters (A1) are bonded to each other by a crosslinking reaction. In the crosslinking reaction, carbon-carbon double bonds derived from the unsaturated carboxylic acid component (y) and/or the unsaturated alcohol component (z) in the polyesters (A1) are bonded to each other. Thus, the non-linear polyester modified resin (A) can be produced. This method is preferred in that the crosslinking reaction can proceed uniformly in a shorter time.

The radical reaction initiator (c) to be used for crosslinking reaction of the polyesters (A1) is not particularly limited. For example, an azo-based compound, diazo-based compound (c1), or an organic peroxide (c2) may be used.

Non-limiting examples of the azo-based compound or diazo-based compound (c1) include 2,2'-azobis-(2,4-dimethyl valeronitrile), 2,2'-azobis isobutyronitrile, 1,1'-azobis (cyclohexane-1-carbonitrile), 2,2'-azobis-4-methoxy-2,4-dimethyl valeronitrile, and azobis isobutyronitrile.

Non-limiting examples of the organic peroxide (c2) include benzoyl peroxide, di-t-butyl peroxide, t-butyl cumyl peroxide, dicumyl peroxide, α,α-bis(t-butylperoxy) diisopropylbenzene, 2,5-dimethyl-2,5-bis(t-butylperoxy) hexane, di-t-hexyl peroxide, 2,5-dimethyl-2,5-di-t-butylperoxyhexine-3, acetyl peroxide, isobutyryl peroxide, octanoyl peroxide, decanoyl peroxide, lauroyl peroxide, 3,3,5-trimethylhexanoyl peroxide, m-tolyl peroxide, t-butyl peroxyisobutyrate, t-butyl peroxyneodecanoate, cumyl peroxyneodecanoate, t-butylperoxy-2-ethyl hexanoate, t-butylperoxy-3,5,5-trimethyl hexanoate, t-butyl peroxylaurate, t-butyl peroxybenzoate, t-butylperoxy isopropyl monocarbonate, and t-butyl peroxyacetate.

Preferred among these are the organic peroxides (c2) because they have high initiator efficiency and do not produce toxic by-products such as cyanide.

Further, particularly preferred are reaction initiators having a high hydrogen abstraction ability because such reaction initiators efficiently promote a crosslinking reaction and can be used in smaller amounts. Examples of such reaction initiators include benzoyl peroxide, di-t-butyl peroxide, t-butyl cumyl peroxide, dicumyl peroxide, α,α-bis(t-butylperoxy)diisopropylbenzene, 2,5-dimethyl-2,5-bis(t-butylperoxy)hexane, and di-t-hexyl peroxide.

The amount of the radical reaction initiator (c) is not particularly limited, but it is preferably 0.1 to 50 parts by weight based on the amount of the unsaturated carboxylic acid component (y).

The radical reaction initiator in an amount of 0.1 parts by weight or more tends to facilitate the crosslinking reaction. The radical reaction initiator in an amount of 50 parts by weight or less tends to result in reduced odor. The amount is more preferably 30 parts by weight or less, still more preferably 20 parts by weight or less, particularly preferably 10 parts by weight or less.

It is preferred to use the radical reaction initiator (c) listed above in the amount described above to produce the polyesters (A1) by radical polymerization because the crosslinking reaction proceeds suitably, thus improving hot offset resistance and heat-resistant storage stability of the toner, and image strength.

In the case of a crosslinking reaction for forming intermolecular carbon-carbon bonds by a radical addition reaction during production of the non-linear polyester modified resin (A), the unsaturated carboxylic acid component (y) and the unsaturated alcohol component (z) may be used as raw materials of the polyesters (A1), for example, in order to introduce carbon-carbon double bonds into the main chain or a side chain of the polyesters (A1).

Alternatively, a component susceptible to hydrogen radical abstraction may be used as a raw material of the polyester (A2), in order to introduce the carbon-carbon double bonds into the main chain or a side chain of the polyesters (A2).

The amount of carbon-carbon double bonds in the polyester (A1) is not particularly limited, but it is preferably 0.02 to 2.00 mmol/g based on the weight of the polyester (A1). The amount thereof is still more preferably 0.06 to 1.9 mmol/g, particularly preferably 0.10 to 1.5 mmol/g, most preferably 0.15 to 1.0 mmol/g.

When the amount of the carbon-carbon double bonds is 0.02 to 2.0 mmol/g based on the weight of the polyester (A1), the crosslinking reaction proceeds suitably, thus improving hot offset resistance of the toner.

The carbon-carbon double bond equivalent in the toner binder of the present invention is preferably 0.50 mmol/g or less based on the weight of the toner binder in terms of color reproducibility and electrostatic charge stability because the double bond equivalent in this range results in reduced coloration and stable electrostatic charge level. The double bond equivalent is more preferably 0.35 mmol/g or less, particularly preferably 0.25 mmol/g or less, most preferably 0 mmol/g.

The amount of carbon-carbon double bonds in the toner binder of the present invention or the polyester (A1) may be quantified by any method, such as a method (1) or a method (2). Either method can be used.

(1) Protons or carbon atoms in carbon-carbon double bonds in the toner binder or the polyester (A1) are measured and quantified with a nuclear magnetic resonance (NMR) apparatus.

(2) Carbon-carbon double bonds in the toner binder and the polyester (A1) are measured and quantified according to the bromine number test method prescribed in JIS K 2605.

Calculation of the amount of carbon-carbon double bonds in the toner binder or the polyester (A1) by the method (1) may be carried out as follows.

<Sample Preparation>

An NMR tube is charged with 100 mg of a sample, 10 mg of trimethylsilyl propanesulfonic acid sodium salt as an internal standard material, and 10 mg of Cr (AcAc)$_3$ as a relaxation reagent. Then, 0.45 ml of a deuterated solvent (e.g., heavy pyridine) is added thereto to dissolve the resin therein.

<Measurement Conditions>

Device: "AVANCE III HD400" available from Bruker Corporation Cumulative number: 24000 times <Analysis and Calculation>

For example, when carbon-carbon double bonds are derived from the unsaturated carboxylic acid components (z) such as maleic acid or fumaric acid, the amount of the carbon-carbon double bonds (mmol/g) is calculated from the ratio of the area of the carbon peak (164.6 ppm) of double bonds derived from the unsaturated carboxylic acid components (z) to the area of the carbon peak (0 ppm) of the internal standard material.

In terms of electrostatic charge stability, the acid value of the polyester (A1) is preferably 0 to 30 mg KOH/g, more preferably 0 to 25 mg KOH/g, still more preferably 0 to 10 mg KOH/g, particularly preferably 0.1 to 10 mg KOH/g.

The acid value of the polyester (A1) can be measured by the method prescribed in JIS K 0070 (1992 edition).

The toner binder of the present invention preferably has at least one inflexion point indicating a glass transition temperature $Tg_T$ in a temperature range of −20° C. to 80° C. in a chart obtained by differential scanning calorimetry (DSC) using the toner binder of the present invention. The inflexion point indicating the glass transition temperature ($Tg_T$) is more preferably located in the temperature range of 35° C. to 65° C. When the inflexion point indicating the glass transition temperature ($Tg_T$) is in the temperature range of −20° C. or higher, heat-resistant storage stability is improved. When the inflexion point indicating the glass transition temperature ($Tg_T$) is in the temperature range of 80° C. or lower, fixability is improved.

The glass transition temperature ($Tg_T$) can be determined by the method (DSC method) prescribed in ASTM D3418-82. The glass transition temperature ($Tg_T$) can be measured using, for example, DSC20 SSC/580 available from Seiko Instruments Inc.

The toner binder of the present invention has a loss tangent tan δ of 2 to 20 in the entire temperature range of 110° C. to 130° C.

Further, the loss tangent tan δ is preferably 2 to 20 at 120° C., particularly preferably 2 to 15 at 120° C., most preferably 2 to 8 at 120° C.

The loss tangent tan δ is a physical property represented as the ratio (G"/G') of storage modulus (G') to loss modulus (G").

Generally, the storage modulus (G') (unit Pa) means elasticity, and it is an index of the energy stored in a material for recovery during deformation from outside pressure. Meanwhile, the loss modulus (G") (unit Pa) means viscosity, and it is an index of the energy lost from a material due to pressure applied during deformation from outside pressure.

In addition, the loss tangent tan δ is an index of the balance between viscosity and elasticity. A loss tangent tan δ of 2 to 20 indicates a good balance between viscosity and elasticity relative to the smoothness (glossiness) of the resulting toner-fixed image.

When the loss tangent tan δ is less than 2 at any point in the temperature range of 110° C. to 130° C., the elasticity is too high for the viscosity, thus resulting in poor glossiness. When the loss tangent tan δ is more than 20, the elasticity is too low for the viscosity, thus resulting in poor hot offset resistance. Generally, it has been difficult to achieve glossiness and hot offset resistance in a balanced manner.

Since values of the loss tangent tan δ, the storage modulus (G'), and the loss modulus (G") are highly temperature-dependent, different temperature ranges result in different values. The values of the loss tangent tan δ, the storage modulus (G'), and the loss modulus (G") in present invention are values measured in the range of 110° C. to 1300 which is close to a cold offset occurrence temperature (MFT).

Although it is difficult to achieve the low-temperature fixability and the glossiness in a balanced manner, when the values are included in the above ranges in the above temperature range, the glossiness and the low-temperature fixability are improved.

The toner binder of the present invention preferably has a storage modulus (G') at 120° C. of 30 to 35,000 Pa in order to provide improved glossiness and hot offset resistance in a balanced manner when it is used. The storage modulus (G') is still more preferably 50 to 20,000 Pa, most preferably 150 to 5,000 Pa.

Although a higher storage modulus (G') tends to result in better hot offset resistance, and a lower storage modulus (G') tends to result in better glossiness, the storage modulus (G') in the above ranges can provide both in a balanced manner.

The toner binder of the present invention preferably has a loss modulus (G") at 120° C. of 60 to 70,000 Pa, in order to provide improved glossiness and low-temperature fixability in a balanced manner when it is used. The loss modulus (G") is more preferably 100 to 40,000 Pa, most preferably 300 to 10,000 Pa.

Although a higher loss modulus (G") tends to result in better glossiness, and a lower loss modulus (G") tends to result in better low-temperature fixability, the loss modulus (G") in the above ranges can provide both in a balanced manner.

Preferable values of the storage modulus (G') and the loss modulus (G") are values at 120° C. that is the median in the range of 110° C. to 130° C.

Now, exemplary methods for adjusting the storage modulus (G') and the loss modulus (G") of the toner binder are described.

For example, the storage modulus (G') and the loss modulus (G") can be increased by a method such as: increasing the amount of carbon-carbon double bonds in the polyester (A1); increasing the ratio of tri- or higher valent components and thus increasing the number of crosslinking points; increasing the molecular weight of the polyester (A1) and/or the polyester (B); or increasing Tg of the polyester (A1) and/or the polyester (B).

For example, the ratio of storage modulus (G")/loss modulus (G'), i.e., the loss tangent tan δ, can be increased by a method such as: reducing the ratio of the polyester (A1) having carbon-carbon double bonds; adding a crystalline resin (C); reducing the molecular weight of the polyester (A1) and/or the polyester (B); reducing Tg of the polyester (A1) and/or the polyester (B).

In the present invention, the loss tangent tan δ, the storage modulus (G'), and the loss modulus (G") of the toner binder can be measured using a viscoelasticity measurement device described below.

Device: ARES-24A (Rheometric Ltd.)
Jig: 25-mm parallel plate
Frequency: 1 Hz
Strain ratio: 5%
Temperature increase rate: 5° C./min
Heating start temperature: 100° C.
Heating end temperature: 200° C.

The toner binder of the present invention may contain tetrahydrofuran (THF) insolubles in some cases.

The percent by weight of the THF insolubles in the toner binder of the present invention is preferably 20% by weight or less, more preferably 15% by weight or less, still more preferably 10% by weight or less, particularly preferably 0.1 to 10% by weight, in terms of glossiness, hot offset resistance, and low-temperature fixability in a balanced manner.

The amount (% by weight) of the THF insolubles in the toner binder of the present invention is determined by a method described below.

A total of 50 ml of THF is added to 0.5 g of a sample, and the mixture is stirred and refluxed for three hours. After cooling, the insolubles are separated by filtration with a glass filter, and the resin remaining on the glass filter is dried at 80° C. under reduced pressure for three hours. The amount of the dried resin remaining on the glass filter is assumed to be the amount of the THF insolubles, and the amount of the THF insolubles is subtracted from the amount of the sample to determine the amount of the THF solubles. Then, the percent by weight of the THF insolubles and the percent by weight of THF solubles are calculated.

In order to improve a toner having heat-resistant storage stability and low-temperature fixability of a toner in a balanced manner, the Mn of THF solubles in the toner binder of the present invention is preferably 500 to 24,000, still more preferably 700 to 17,000, particularly preferably 900 to 12,000.

In order to improve hot offset resistance and low-temperature fixability of a toner in a balanced manner, the Mw of the THF solubles in the toner binder of the present invention is preferably 5,000 to 120,000, still more preferably 7,000 to 100,000, particularly preferably 9,000 to 90,000, most preferably 10,000 to 80,000.

The molecular weight distribution Mw/Mn of the THF solubles in the toner binder of the present invention is preferably 2 to 30, more preferably 2.5 to 28, particularly preferably 3 to 26, in order to improve hot offset resistance, heat-resistant storage stability, and low-temperature fixability of a toner in a balanced manner.

The toner binder of the present invention preferably contains the polyester (B) containing a carboxylic acid component and an alcohol component as raw materials.

The presence of the polyester (B) in the toner binder of the present invention improves the low-temperature fixability.

The carboxylic acid component as a raw material of the polyester (B) is preferably the saturated carboxylic acid component (w). The alcohol component as a raw material of the polyester (B) is preferably the saturated alcohol component (x).

The polyester (B) is a resin that does not contain either the unsaturated carboxylic acid component (y) or the unsaturated alcohol component (z).

The polyester (B) may contain THF insolubles in some cases.

When the polyester (B) contains THF insolubles, the amount of the THF insolubles is preferably 1.0% by weight or less, more preferably 0.1 to 1.0% by weight.

The polyester (B) preferably does not contain THF insolubles.

In the case where the toner binder of the present invention contains the polyester (A1) and the polyester (B), the weight ratio of the polyester (A1) to the polyester (B) ((A1)/(B)) is preferably 5/95 to 50/50, still more preferably 7/93 to 45/60, particularly preferably 10/90 to 40/60, in terms of low-temperature fixability, hot offset resistance, and heat-resistant storage stability in a balanced manner.

In addition, the polyester (B) may be linear or non-linear, but is preferably linear in terms of low-temperature fixability and heat-resistant storage stability.

Specific examples thereof include a polyester resin obtained by condensation of the saturated alcohol component (x) and the saturated carboxylic acid component (w) with each other.

The polyester (B) may have a few crosslinking points as long as it does not contain THF insolubles. The polyester (B) may be one that is modified at a molecular end thereof with an acid anhydride (e.g., trimellitic anhydride or phthalic anhydride) of a polycarboxylic acid (which may be a tri- or higher valent polycarboxylic acid).

In order to improve heat-resistant storage stability and low-temperature fixability of a toner in a balanced manner, the Mn of the THF solubles in the polyester (B) is preferably 1,000 to 15,000, still more preferably 1,200 to 10,000, particularly preferably 1,500 to 5,000.

In order to provide a toner having hot offset resistance, heat-resistant storage stability, and low-temperature fixability in a balanced manner, the Mw of the THF solubles in the polyester (B) is preferably 2,000 to 30,000, still more preferably 2,500 to 20,000, particularly preferably 3,000 to 10,000.

In the case where the toner binder of the present invention contains the polyester (B), the non-linear polyester modified resin (A) may be a modified resin produced by mutually crosslinking carbon-carbon double bonds derived from the polyester (A1) having carbon-carbon double bonds in a state where the polyester (A1) having carbon-carbon double bonds and the polyester (B) are mixed together.

When the non-linear polyester modified resin (A) is produced as described above, the crosslinking reaction can proceed uniformly in a short time.

Further, a crosslinking reaction between carbon-carbon double bonds derived from the polyester (A1) having carbon-carbon double bonds is preferably initiated by the radical reaction initiator (c).

With the use of the radical reaction initiator (c), the crosslinking reaction proceeds uniformly in a shorter time.

The toner binder of the present invention preferably contains the crystalline resin (C) other than polyester.

The presence of the crystalline resin (C) other than polyester in the toner binder of the present invention results in good low-temperature fixability and good glossiness.

As used herein, the "crystalline" in the crystalline resin (C) means that the ratio of softening temperature measured with Koka-type (elevated) flow tester to maximum peak temperature of heat of fusion (melting point) measured with a differential scanning calorimeter (DSC) (softening temperature/maximum peak temperature of heat of fusion (melting point)) is 0.80 to 1.55. A resin having such a parameter is sharply softened by heat, and a resin having such properties is "the crystalline resin (C)" as used herein.

The amount of the crystalline resin (C) in the toner binder of the present invention is usually 2 to 50% by weight, preferably 3 to 30% by weight, more preferably 5 to 15% by weight, in terms of flowability, heat-resistant storage stability, and grindability of the toner, as well as image strength, low-temperature fixability, and glossiness of the toner-fixed image.

The crystalline resin (C) may have any chemical structure as long as it is compatible with the non-linear polyester modified resin (A) at the time of fixing.

Examples thereof include compounds such as crystalline polyester resins, crystalline polyurethane resins, crystalline polyurea resins, crystalline polyamide resins, and crystalline polyvinyl resins. Preferred among these are crystalline polyester resins in terms of compatibility. In terms of crystallinity, a crystalline polyester resin containing at least 80% by mole of straight chain aliphatic diol is preferred.

A method for producing the toner binder is described.

The toner binder is not particularly limited as long as it contains the non-linear polyester modified resin (A). For example, when mixing two kinds of polyester resins and additives, the mixing method may be a known method that is commonly used, and any of powder mixing, melt mixing, and solvent mixing can be used. Mixing may be performed during toner production. Preferred among these methods is melt mixing that enables uniform mixing, without the need for solvent removal.

Examples of mixing devices for powder mixing include a Henschel mixer, a Nauta mixer, and a Banbury mixer. A Henschel mixer is preferred.

Examples of mixing devices for melt mixing include batch mixing devices such as a reaction vessel, and continuous mixing devices. Continuous mixing devices are preferred in order to uniformly mix at an appropriate temperature in a short time. Examples of the continuous mixing devices include extruders, continuous kneaders, and three-roll mills.

Examples of methods for solvent mixing include a method in which two kinds of polyester resins are dissolved and homogenized in solvent(s) (e.g., ethyl acetate, THF, and acetone), followed by solvent removal and grinding; and a method in which two kinds of polyester resins are dissolved in solvent(s) (e.g., ethyl acetate, THF, and acetone) and dispersed in water, followed by granulation and solvent removal.

Specific examples of methods for melt mixing include one in which the polyester (A1) or a mixture of the polyester (A1) and the polyester (B) is poured into a twin screw extruder at a constant rate, and the radical reaction initiator (c) is also simultaneously poured thereinto at a constant rate so as to cause a reaction while these components are kneaded and conveyed at a temperature of 100° C. to 200° C.

At this time, the polyester (A1) and the polyester (B) as reaction raw materials to be charged or poured into a twin screw extruder may be poured in the form of resin reaction mixtures into the extruder directly without being cooled. Alternatively, produced resin reaction mixtures of the polyester (A1) and the polyester (B) may be cooled and ground first, and then fed in the form of particles into the twin screw extruder.

The method for melt mixing is not limited to any of these specific exemplary methods. Needless to say, melt mixing can be performed by an appropriate method such as one in which raw materials are fed into a reaction vessel, heated at a temperature high enough to melt the raw materials, and then mixed.

The toner of the present invention contains the toner binder of the present invention and a colorant.

Any dyes and pigments used as coloring agents for toners may be used as the colorant. Specific examples thereof include carbon black, iron black, Sudan black SM, Fast Yellow G, Benzidine Yellow, Pigment Yellow, Indo Fast Orange, Irgazin Red, Paranitroaniline Red, Toluidine Red, Carmine FB, Pigment Orange R, Lake Red 2G, Rhodamine FB, Rhodamine B Lake, Methylviolet B Lake, Phthalocyanine Blue, Pigment Blue, Brilliant Green, Phthalocyanine Green, Oil Yellow GG, Kayaset YG, Orasol Brown B, and Oil Pink OP. These colorants may be used alone or in combination of two or more of them. If necessary, magnetic powder (powder of a ferromagnetic metal such as iron, cobalt, or nickel, or a compound such as magnetite, hematite, or ferrite) may be added to also serve as a colorant.

The amount of the colorant is preferably 1 to 40 parts by weight, more preferably 3 to 10 parts by weight, relative to 100 parts by weight of the toner binder of the present invention. The amount of magnetic powder, if used, is preferably 20 to 150 parts by weight, more preferably 40 to 120 parts by weight.

The toner of the present invention may contain one or more additives selected from a release agent, a charge controlling agent, a fluidizer, and like other agents, in addition to the toner binder and the colorant.

Preferred as the release agent are those having a softening point [Tm] of 50° C. to 170° C. as measured by a flow tester, examples of which include polyolefin wax, natural wax, C30-C50 aliphatic alcohols, C30-C50 fatty acids, and mixtures thereof.

Examples of the polyolefin wax includes (co)polymers of olefins (e.g., ethylene, propylene, 1-butene, isobutylene, 1-hexene, 1-dodecene, 1-octadecene, and mixtures thereof) [including those obtained by (co)polymerization and thermo-degradation type polyolefins], oxides with oxygen and/or ozone of (co)polymers of olefins, maleic acid-modified products of (co)polymers of olefins [e.g., those modified with maleic acid and derivatives thereof (e.g., maleic anhydride, monomethyl maleate, monobutyl maleate, and dimethyl maleate)], copolymers of olefins and unsaturated carboxylic acids [such as (meth)acrylic acid, itaconic acid, and maleic anhydride] and/or unsaturated carboxylic acid alkyl esters [such as (meth)acrylic acid alkyl (C1-C18 alkyl group) esters, and maleic acid alkyl (C1-C18 alkyl group) esters], and Sasol wax.

Examples of the natural waxes include carnauba wax, montan wax, paraffin wax, and rice wax. Examples of C30-C50 aliphatic alcohols include triacontanol. Examples of C30-C50 fatty acids include triacontane carboxylic acid.

Examples of the charge controlling agent include nigrosine dyes, triphenylmethane dyes containing a tertiary amine as a side chain, quaternary ammonium salts, polyamine resins, imidazole derivatives, quaternary ammonium salt group-containing polymers, metal-containing azo dyes, copper phthalocyanine dyes, salicylic acid metal salts, boron complexes of benzilic acid, sulfonic acid group-containing polymers, fluorine-containing polymers, and halogen-substituted aromatic ring-containing polymers.

Examples of the fluidizer include colloidal silica, alumina powder, titanium oxide powder, and calcium carbonate powder.

The amount of the release agent is 0 to 30% by weight, preferably 0.5 to 20% by weight, particularly preferably 1 to 10% by weight, based on the weight of the toner.

The amount of the charge controlling agent is 0 to 20% by weight, preferably 0.1 to 10% by weight, particularly preferably 0.5 to 7.5% by weight, based on the weight of the toner.

The amount of the fluidizer is 0 to 10% by weight, preferably 0 to 5% by weight, particularly preferably 0.1 to 4% by weight, based on the weight of the toner.

The total amount of the additives is 3 to 70% by weight, preferably 4 to 58% by weight, particularly preferably 5 to 50% by weight, based on the weight of the toner. A toner having good electrostatic charging properties can be readily obtained when the proportions of the components of the toner are within the above ranges.

The toner of the present invention may be obtained by any known method such as a kneading grinding method, a phase-change emulsion method, or a polymerization method.

For example, in the case where a toner is obtained by a kneading grinding method, the toner can be produced as follows: components (other than a fluidizer) that constitute the toner are dry-blended, melt-kneaded, coarsely ground, and ultimately formed into fine particles using a jet mill grinder or the like. Further, these particles are classified to obtain fine particles preferably having a volume particle diameter (D50) in the range of 5 to 20 μm, followed by mixing with a fluidizer.

The average particle diameter (D50) is measured using a Coulter counter [e.g., product name: Multisizer III (Coulter)].

In the case of the phase-change emulsion method, the toner can be obtained as follows: components (other than a fluidizer) of the toner are dissolved or dispersed in an organic solvent, emulsified by, for example, adding water thereto, and then separated and classified. The volume average particle diameter of the toner is preferably 3 to 15 μm.

The toner of the present invention can be used as a developer for electric latent images. The toner of the present invention may be mixed with carrier particles such as iron powder, glass beads, nickel powders, ferrite, magnetite, and ferrite whose surface is coated with resin (e.g., acrylic resin or silicone resin). When carrier particles are used, the weight ratio of the toner to the carrier particles is preferably 1/99 to 99/1. It is also possible to form electric latent images by friction with a member such as an electrostatically charged blade instead of mixing with the carrier particles.

The toner of the present invention may not be required to contain carrier particles.

The toner of the present invention is fixed on a supporting material (e.g., paper or polyester film) to obtain a recording material by a device such as a copy machine or a printer. The toner can be fixed on a supporting material by a known method such as a heat roll fixing method or a flash fixing method.

EXAMPLES

The present invention is further described below with reference to examples and comparative examples, but the present invention is not limited thereto. Hereinafter, " part(s)" means part(s) by weight unless otherwise specified.

<Production Example 1>[Production of Polyester (A1-1)]

A reaction vessel equipped with a condenser, a stirrer, and a nitrogen inlet was charged with 737 parts (100.0% by mole) of a bisphenol A-EO (2 mol) adduct, 153 parts (42.0% by mole) of terephthalic acid, 164 parts (51.2% by mole) of adipic acid, 17 parts (6.8% by mole) of fumaric acid, 2.5 parts of titanium diisopropoxy bistriethanolaminate as a condensation catalyst, and 5 parts of tert-butyl catechol as a polymerization inhibitor. The mixture was allowed to react at 180° C. for four hours under a nitrogen stream while generated water was removed. The reaction was continued for additional 10 hours under a reduced pressure of 0.5 to 2.5 kPa. Then, the reaction product was taken out. Thus, the polyester (A1-1) was obtained.

The double bond equivalent of the polyester (A1-1) was 0.15 mmol/g, $Tg_{A1}$ was 39° C., and the peak top molecular weight was 18,400.

<Production Examples 2 to 18>[Production of Polyesters (A1-2) to (A1-18)]

The polyesters (A1-2) to (A1-18) were obtained by a reaction in the same manner as in Production Example 1, except that in each production example, a reaction vessel equipped with a condenser, a stirrer, and a nitrogen inlet was charged with the alcohol components and the carboxylic acid components according to Table 1. Table 1 shows the double bond equivalent, $Tg_{A}1$, and the peak top molecular weight of each of the polyesters (A1-2) to (A1-18) obtained.

TABLE 1

| | | Production Ex. 1 | Production Ex. 2 | Production Ex. 3 | Production Ex. 4 | Production Ex. 5 | Production Ex. 6 | Production Ex. 7 | Production Ex. 8 | Production Ex. 9 | Production Ex. 10 | Production Ex. 11 |
|---|---|---|---|---|---|---|---|---|---|---|---|---|
| | | (A1-1) | (A1-2) | (A1-3) | (A1-4) | (A1-5) | (A1-6) | (A1-7) | (A1-8) | (A1-9) | (A1-10) | (A1-11) |
| | | | | | | | Polyester (A1) | | | | | |
| Composition (parts by weight) | Saturated alcohol component (x) | | | | | | | | | | | |
| | Bisphenol A-EO (2.0 mol) adduct | 737 | 748 | — | — | 753 | — | 721 | 533 | — | 761 | — |
| | 3-Methyl-1,5-pentanediol | — | — | — | — | — | — | — | — | 559 | — | — |
| | Trimethylolpropane | — | — | — | — | — | — | — | — | 17 | — | — |
| | Bisphenol A-PO (2.0 mol) adduct | — | — | 749 | 767 | — | 712 | — | — | — | — | 772 |
| | Unsaturated carboxylic acid component (y) | | | | | | | | | | | |
| | Fumaric acid | 17 | 26 | 14 | — | — | — | — | 21 | 27 | 26 | 21 |
| | Maleic anhydride | — | — | — | 16 | — | — | — | — | — | — | — |
| | Acrylic acid | — | — | — | — | 19 | — | — | — | — | — | — |
| | Methacrylic acid | — | — | — | — | — | 54 | 28 | — | — | — | — |
| | Unsaturated alcohol component (z) | | | | | | | | | | | |
| | Oleyl alcohol | — | — | — | — | — | — | — | — | — | — | — |
| | 2-Hydroxyethyl methacrylate | — | — | — | — | — | — | — | — | — | — | — |
| | Saturated carboxylic acid component (w) | | | | | | | | | | | |
| | Terephthalic acid | 153 | 144 | 146 | 139 | 145 | 144 | 155 | 551 | 577 | 287 | 274 |
| | Adipic acid | 164 | 155 | 157 | 149 | 156 | 155 | 167 | 43 | 45 | — | — |
| | Trimellitic anhydride | — | — | 40 | 32 | 30 | 24 | 26 | 24 | — | — | — |
| Properties | Double bond equivalent (mmol/g) | 0.15 | 0.22 | 0.14 | 0.22 | 0.23 | 0.20 | 0.22 | 0.22 | 0.23 | 0.22 | 0.21 |
| | Glass transition temperature (TgA1) (° C.) | 39 | 38 | 40 | 32 | 30 | 24 | 26 | −6 | −9 | 20 | 20 |
| | Peak top molecular weight | 18,400 | 13,900 | 18,100 | 9,400 | 8,800 | 9,300 | 8,400 | 14,100 | 13,800 | 13,000 | 12,000 |

| | | Production Ex. 12 | Production Ex. 13 | Production Ex. 14 | Production Ex. 15 | Production Ex. 16 | Production Ex. 17 | Production Ex. 18 | Comparative Production Ex. 1 | Comparative Production Ex. 2 |
|---|---|---|---|---|---|---|---|---|---|---|
| | | (A1-12) | (A1-13) | (A1-14) | (A1-15) | (A1-16) | (A1-17) | (A1-18) | (A1'-1) | (A1'-2) |
| | | | | | | Polyester (A1) | | | | |
| Composition (parts by weight) | Saturated alcohol component (x) | | | | | | | | | |
| | Bisphenol A-EO (2.0 mol) adduct | 748 | 769 | 762 | 738 | — | 739 | — | — | — |
| | 3-Methyl-1,5-pentanediol | 13 | — | — | 13 | — | 13 | — | 61 | — |
| | Trimethylolpropane | — | — | — | — | — | — | — | 20 | — |
| | Bisphenol A-PO (2.0 mol) adduct | — | — | — | — | 770 | — | 771 | 604 | 679 |
| | Unsaturated carboxylic acid component (y) | | | | | | | | | |
| | Fumaric acid | 26 | 21 | — | 26 | 20 | 40 | 36 | — | 16 |
| | Maleic anhydride | — | — | — | — | — | — | — | — | — |
| | Acrylic acid | — | — | — | — | — | — | — | — | — |
| | Methacrylic acid | — | — | 19 | — | — | — | — | — | — |
| | Unsaturated alcohol component (z) | | | | | | | | | |
| | Oleyl alcohol | — | — | — | — | — | — | — | — | — |
| | 2-Hydroxyethyl methacrylate | — | — | — | — | — | — | — | — | — |
| | Saturated carboxylic acid component (w) | | | | | | | | | |
| | Terephthalic acid | 289 | 262 | 273 | 73 | 64 | 137 | 118 | 288 | 260 |
| | Adipic acid | — | 16 | 17 | 226 | 195 | 147 | 127 | 65 | 99 |
| | Trimellitic anhydride | 17 | 20 | 15 | 27 | 31 | 37 | 15 | 34 | — |
| Properties | Double bond equivalent (mmol/g) | 0.22 | 0.22 | 0.22 | 0.22 | 0.21 | 0.34 | 0.31 | 0 | 0.14 |
| | Glass transition temperature (TgA1) (° C.) | 17 | 20 | 15 | 27 | 31 | 37 | 40 | 15 | 91 |
| | Peak top molecular weight | 11,300 | 11,900 | 10,700 | 12,200 | 11,800 | 10,600 | 11,300 | 7,500 | 8,500 |

<Comparative Production Example 1>[Production of Polyester (A1'-1)]

The polyester (A1'-1) was obtained by a reaction in the same manner as in Production Example 1, except that a reaction vessel equipped with a condenser, a stirrer, and a nitrogen inlet was charged with the alcohol component and the carboxylic acid component according to Table 1.

The polyester (A1'-1) does not contain carbon-carbon double bonds.

<Comparative Production Example 2>[Production of Polyester (A1'-2)]

The polyester (A1'-2) was obtained by a reaction in the same manner as in Production Example 1, except that a reaction vessel equipped with a condenser, a stirrer, and a nitrogen inlet was charged with the alcohol component and the carboxylic acid component according to Table 1. Table 1 shows $Tg_{A1}$ and the peak top molecular weight.

<Production Example 19>[Production of Polyester (B-1)]

A reaction vessel equipped with a condenser, a stirrer, and a nitrogen inlet was charged with 746 parts (100.0% by mole) of a bisphenol A-PO (2 mol) adduct, 262 parts (84.1% by mole) of terephthalic acid, 19 parts (6.9% by mole) of adipic acid, and 0.6 parts of titanium diisopropoxy bistriethanolaminate as a condensation catalyst. The mixture was allowed to react at 220° C. for four hours under a nitrogen stream while generated water was removed. The reaction was continued for additional 10 hours under reduced pressure of 0.5 to 2.5 kPa. Then, the temperature was cooled to 180° C., and 32 parts (9.0% by mole) of trimellitic anhydride was added. After the reaction in a sealed vessel for one hour under normal pressure, the reaction product was taken out. Thus, the polyester (B-1) was obtained. The polyester (B-1) does not contain carbon-carbon double bonds.

<Production Examples 20 to 26>[Production of Polyesters (B-2) to (B-8)]

The polyesters (B-2) to (B-8) were obtained by a reaction in the same manner as in Production Example 19, except that in each production example, a reaction vessel equipped with a condenser, a stirrer, and a nitrogen inlet was charged with the alcohol components and the carboxylic acid components according to Table 2.

The polyesters (B-2) to (B-8) do not contain carbon-carbon double bonds.

<Production Example 27>[Production of Crystalline Resin (C-1)]

A reaction vessel equipped with a condenser, a stirrer, and a nitrogen inlet was charged with 716 parts of dodecanedioic acid, 394 parts of 1,6-hexane diol, and 0.5 parts of tetrabutoxy titanate as a condensation catalyst. The mixture was allowed to react at 170° C. for eight hours under a nitrogen stream while generated water was removed. Then, the reaction was continued for additional four hours under a nitrogen stream while generated water was removed as the temperature was gradually increased up to 220° C. Further, the reaction was continued under reduced pressure of 0.5 to 2.5 kPa, and the reaction product was taken out when the acid value reached 0.5 or lower. Thus, the crystalline resin (C-1) was obtained. The softening temperature of the crystalline resin (C-1) was 78° C. and the melting point thereof was 72° C. The softening temperature/melting point ratio was 1.08. A resin with such properties is sharply softened by heat, and is thus a crystalline resin.

<Example 1>[Production of Toner Binder (D-1)]

A mixture of 30 parts of the polyester (A1-1) and 70 parts of the polyester (B-1) was fed into a twin screw kneader (S5KRC kneader available from Kurimoto, Ltd.) at 10 kg/hour, and at the same time, 1.0 part of t-butyl peroxybenzoate (c-1) as the radical reaction initiator (c) was fed thereinto at 0.10 kg/hour to carry out a crosslinking reaction by kneading and extrusion at 160° C. for 15 minutes. The resultant product was cooled. Thus, the toner binder (D-1) of the present invention was obtained.

<Examples 2 to 21>[Production of Toner Binders (D-2) to (D-21)]

In each example, a mixture of the polyester (A1), the polyester (B), and the crystalline resin (C) in parts by weight according to Table 3 was fed into a twin screw kneader in the same manner as is the case with Example 1, and at the same time, the radical reaction initiator (c) was fed thereinto to carry out a crosslinking reaction in the same manner as in Example 1. Thus, the toner binders (D-2) to (D-21) of the present invention were obtained.

The radical reaction initiators (c) in Table 3 are as follows.
(c-1): t-Butyl peroxybenzoate
(c-2): di-t-Butyl peroxide
(c-3): t-Butylperoxy isopropyl monocarbonate

TABLE 2

| | | | Production Ex. 19 | Production Ex. 20 | Production Ex. 21 | Production Ex. 22 | Production Ex. 23 | Production Ex. 24 | Production Ex. 25 | Production Ex. 26 |
|---|---|---|---|---|---|---|---|---|---|---|
| | | | | | | Polyester (B) | | | | |
| | | | (B-1) | (B-2) | (B-3) | (B-4) | (B-5) | (B-6) | (B-7) | (B-8) |
| Composition (parts by weight) | Alcohol component | Bisphenol A-PO (2.0 mol) adduct | 746 | 747 | 583 | 221 | 397 | 386 | 388 | 391 |
| | | Bisphenol A-PO (3.0 mol) adduct | — | — | 182 | 555 | — | — | — | — |
| | | Bisphenol A-EO (2.0 mol) adduct | — | — | — | — | 373 | 363 | 365 | 367 |
| | Carboxylic acid component | Terephthalic acid | 262 | 249 | 283 | 268 | 198 | 273 | 269 | 190 |
| | | Trimellitic anhydride | 32 | 32 | 11 | 12 | 29 | 34 | 29 | 34 |
| | | Adipic acid | 19 | 31 | — | — | 57 | — | — | 75 |

TABLE 3

|  |  |  |  | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Ex. 12 | Ex. 13 |
|---|---|---|---|---|---|---|---|---|---|---|---|---|---|---|---|---|
|  |  |  |  | \multicolumn{13}{c}{Toner binder (D)} |
|  |  |  |  | (D-1) | (D-2) | (D-3) | (D-4) | (D-5) | (D-6) | (D-7) | (D-8) | (D-9) | (D-10) | (D-11) | (D-12) | (D-13) |
| Components (parts by weight) | Non-linear polyester resin (A) | Polyester (A1) | (A1-1) | 30 | 30 | — | — | — | — | — | — | — | — | — | — | — |
|  |  |  | (A1-2) | — | — | 20 | — | — | — | — | — | — | — | — | — | — |
|  |  |  | (A1-3) | — | — | — | 30 | — | — | — | — | — | — | — | — | — |
|  |  |  | (A1-4) | — | — | — | — | 20 | — | — | — | — | — | — | — | — |
|  |  |  | (A1-5) | — | — | — | — | — | 20 | — | — | — | — | — | — | — |
|  |  |  | (A1-6) | — | — | — | — | — | — | 20 | — | — | — | — | — | — |
|  |  |  | (A1-7) | — | — | — | — | — | — | — | 20 | — | — | — | — | — |
|  |  |  | (A1-8) | — | — | — | — | — | — | — | — | 20 | — | — | — | — |
|  |  |  | (A1-9) | — | — | — | — | — | — | — | — | — | 20 | — | — | — |
|  |  |  | (A1-10) | — | — | — | — | — | — | — | — | — | — | 20 | — | — |
|  |  |  | (A1-11) | — | — | — | — | — | — | — | — | — | — | — | 20 | — |
|  |  |  | (A1-12) | — | — | — | — | — | — | — | — | — | — | — | — | 23 |
|  |  |  | (A1-13) | — | — | — | — | — | — | — | — | — | — | — | — | — |
|  |  |  | (A1-14) | — | — | — | — | — | — | — | — | — | — | — | — | — |
|  |  |  | (A1-15) | — | — | — | — | — | — | — | — | — | — | — | — | — |
|  |  |  | (A1-16) | — | — | — | — | — | — | — | — | — | — | — | — | — |
|  |  |  | (A1-17) | — | — | — | — | — | — | — | — | — | — | — | — | — |
|  |  |  | (A1-18) | — | — | — | — | — | — | — | — | — | — | — | — | — |
|  |  |  | (A1'-1) | — | — | — | — | — | — | — | — | — | — | — | — | — |
|  |  |  | (A1'-2) | — | — | — | — | — | — | — | — | — | — | — | — | — |
|  |  | Radical reaction initiator (c) | (c-1) | 1.0 | 1.0 | 1.0 | — | — | 1.0 | — | 1.0 | — | 2.0 | 2.0 | — | — |
|  |  |  | (c-2) | — | — | — | 1.0 | 1.0 | — | 1.0 | — | 1.0 | — | — | — | 1.0 |
|  |  |  | (c-3) | — | — | — | — | — | — | — | — | — | — | — | 2.0 | — |
|  | Polyester (B) |  | (B-1) | 70 | 70 | — | 70 | — | — | — | — | — | — | — | — | — |
|  |  |  | (B-2) | — | — | 80 | — | 80 | 80 | 80 | 80 | — | — | — | — | — |
|  |  |  | (B-3) | — | — | — | — | — | — | — | — | 80 | 80 | — | — | — |
|  |  |  | (B-4) | — | — | — | — | — | — | — | — | — | — | 80 | 80 | — |
|  |  |  | (B-5) | — | — | — | — | — | — | — | — | — | — | — | — | 77 |
|  |  |  | (B-6) | — | — | — | — | — | — | — | — | — | — | — | — | — |
|  |  |  | (B-7) | — | — | — | — | — | — | — | — | — | — | — | — | — |
|  |  |  | (B-8) | — | — | — | — | — | — | — | — | — | — | — | — | — |
|  | Crystalline resin (C) |  | (C-1) | — | 10 | — | — | — | — | — | — | — | — | — | — | — |
|  | Weight ratio (A1)/(B) |  |  | 30/70 | 30/70 | 20/80 | 30/70 | 20/80 | 20/80 | 20/80 | 20/80 | 20/80 | 20/80 | 20/80 | 20/80 | 23/77 |
| Properties | Glass transition temperature (TgT) |  |  | 57 | 54 | 55 | 58 | 56 | 54 | 52 | 53 | 45 | 41 | 40 | 40 | 40 |
|  | tan δ at 110° C. |  |  | 2.3 | 2.5 | 5.1 | 2.3 | 5.0 | 3.9 | 4.8 | 4.2 | 3.3 | 3.4 | 8.8 | 10.1 | 5.5 |
|  | tan δ at 120° C. |  |  | 2.5 | 2.7 | 6.2 | 2.4 | 5.9 | 4.6 | 5.2 | 4.7 | 3.4 | 3.5 | 12.5 | 11.1 | 7.5 |
|  | tan δ at 130° C. |  |  | 2.7 | 3.0 | 7.2 | 2.6 | 6.4 | 4.8 | 5.8 | 5.1 | 3.5 | 3.5 | 10.8 | 12.4 | 9.5 |
|  | Double bond equivalent (mM/g) |  |  | 0.0 | 0.0 | 0.0 | 0.0 | 0.0 | 0.0 | 0.1 | 0.0 | 0.1 | 0.0 | 0.0 | 0.0 | 0.0 |
|  | (G') at 120° C. (Pa) |  |  | 1,560 | 710 | 140 | 1,620 | 150 | 200 | 170 | 185 | 300 | 270 | 30 | 35 | 46 |
|  | (G") at 120° C. (Pa) |  |  | 3,850 | 1,920 | 870 | 3,900 | 890 | 920 | 880 | 870 | 1,010 | 950 | 375 | 390 | 345 |
|  | THF insolubles (%) |  |  | 4 | 3 | 3 | 4 | 6 | 12 | 3 | 10 | 4 | 4 | 3 | 3 | 2 |

|  |  |  |  | Ex. 14 | Ex. 15 | Ex. 16 | Ex. 17 | Ex. 18 | Ex. 19 | Ex. 20 | Ex. 21 | Com. Ex. 1 | Com. Ex. 20 | Com. Ex. 3 |
|---|---|---|---|---|---|---|---|---|---|---|---|---|---|---|
|  |  |  |  | \multicolumn{11}{c}{Toner binder (D)} |
|  |  |  |  | (D-14) | (D-15) | (D-16) | (D-17) | (D-18) | (D-19) | (D-20) | (D-21) | (D'-1) | (D'-2) | (D'-3) |
| Components (parts by weight) | Non-linear polyester resin (A) | Polyester (A1) | (A1-1) | — | — | — | — | — | — | — | — | — | — | — |
|  |  |  | (A1-2) | — | — | — | — | — | — | — | — | — | — | — |
|  |  |  | (A1-3) | — | — | — | — | — | — | — | — | — | — | — |
|  |  |  | (A1-4) | — | — | — | — | — | — | — | — | — | — | — |
|  |  |  | (A1-5) | — | — | — | — | — | — | — | — | — | — | — |
|  |  |  | (A1-6) | — | — | — | — | — | — | — | — | — | — | — |
|  |  |  | (A1-7) | — | — | — | — | — | — | — | — | — | — | — |
|  |  |  | (A1-8) | — | — | — | — | — | — | — | — | — | — | — |
|  |  |  | (A1-9) | — | — | — | — | — | — | — | — | — | — | — |
|  |  |  | (A1-10) | — | — | — | — | — | — | — | — | — | — | — |
|  |  |  | (A1-11) | — | — | — | — | — | — | — | — | — | — | — |
|  |  |  | (A1-12) | — | — | — | — | — | — | — | — | — | — | — |
|  |  |  | (A1-13) | 23 | — | — | — | — | — | — | — | — | — | — |
|  |  |  | (A1-14) | — | 23 | — | — | — | — | — | — | — | — | — |
|  |  |  | (A1-15) | — | — | 23 | 23 | — | — | — | — | — | — | 23 |
|  |  |  | (A1-16) | — | — | — | — | 23 | 23 | — | — | — | — | — |
|  |  |  | (A1-17) | — | — | — | — | — | — | 15 | — | — | — | — |
|  |  |  | (A1-18) | — | — | — | — | — | — | — | 15 | — | — | — |
|  |  |  | (A1'-1) | — | — | — | — | — | — | — | — | 30 | — | — |
|  |  |  | (A1'-2) | — | — | — | — | — | — | — | — | — | 30 | — |

TABLE 3-continued

|  |  |  |  |  |  |  |  |  |  |  |  |  |
|---|---|---|---|---|---|---|---|---|---|---|---|---|
|  | Radical reaction initiator (c) | (c-1) | — | — | — | — | 1.0 | — | — | — | 1.0 | 1.0 | — |
|  |  | (c-2) | — | — | 1.0 | 1.0 | — | — | — | 1.0 | — | — | 1.0 |
|  |  | (c-3) | 2.0 | 2.0 | — | — | — | 1.0 | 2.0 | — | — | — | — |
|  | Polyester (B) | (B-1) | — | — | — | — | — | — | — | — | 70 | 70 | — |
|  |  | (B-2) | — | — | — | — | — | — | — | — | — | — | — |
|  |  | (B-3) | — | — | — | — | — | — | — | — | — | — | — |
|  |  | (B-4) | — | — | — | — | — | — | — | — | — | — | — |
|  |  | (B-5) | 77 | 77 | — | — | — | — | — | — | — | — | — |
|  |  | (B-6) | — | — | 77 | 77 | 77 | 77 | — | — | — | — | — |
|  |  | (B-7) | — | — | — | — | — | — | 85 | 85 | — | — | — |
|  |  | (B-8) | — | — | — | — | — | — | — | — | — | — | 77 |
|  | Crystalline resin (C) | (C-1) | — | — | — | 5 | — | 5 | — | — | — | — | 5 |
|  | Weight ratio (A1)/(B) |  | 23/77 | 23/77 | 23/77 | 23/77 | 23/77 | 23/77 | 15/85 | 15/85 | 30/70 | 30/70 | 23/77 |
| Properties | Glass transition temperature (TgT) |  | 41 | 39 | 49 | 38 | 52 | 40 | 54 | 55 | 50 | 82 | 30 |
|  | tan δ at 110° C. |  | 6.0 | 5.6 | 5.9 | 7.7 | 6.0 | 8.0 | 7.9 | 7.8 | 9.8 | 1.4 | 11.4 |
|  | tan δ at 120° C. |  | 7.4 | 7.5 | 8.1 | 11.5 | 8.1 | 11.3 | 10.9 | 10.6 | 15.0 | 1.9 | 15.7 |
|  | tan δ at 130° C. |  | 9.3 | 9.3 | 10.8 | 15.4 | 10.7 | 15.8 | 14.6 | 13.4 | 17.9 | 1.9 | 21.6 |
|  | Double bond equivalent (mM/g) |  | 0.0 | 0.0 | 0.0 | 0.0 | 0.0 | 0.0 | 0.0 | 0.1 | 0.0 | 0.0 | 0.0 |
|  | (G') at 120° C. (Pa) |  | 47 | 40 | 100 | 40 | 111 | 40 | 63 | 65 | 190 | 46,440 | 14 |
|  | (G'') at 120° C. (Pa) |  | 350 | 300 | 810 | 460 | 900 | 450 | 685 | 690 | 2,850 | 87,390 | 220 |
|  | THF insolubles (%) |  | 3 | 3 | 5 | 4 | 4 | 3 | 3 | 3 | 0 | 21 | 4 |

<Comparative Examples 1 to 3>[Production of Toner Binders (D'-1) to (D'-3)]

In each example, a mixture of the polyester (A1) or (A1'), the polyester (B), and the crystalline resin (C) in parts by weight according to Table 3 was fed into a twin screw kneader in the same manner as is the case with Example 1, and at the same time, the radical reaction initiator (c) was fed thereinto to carry out a crosslinking reaction in the same manner as in Example 1. Thus, the toner binders (D'-1) to (D'-3) were obtained.

The glass transition temperature (Tg$_T$) and the amount of the THF insolubles were measured for each of the toner binders according to the examples and the comparative examples. Table 3 shows the results.

The storage modulus (G') and the loss modulus (G") at 110° C., 120° C., and 130° C. were also measured to calculate the loss tangent tan δ at each temperature. Table 3 shows the results.

Table 3 also shows the storage modulus (G') and loss modulus (G") at 120° C.

<Example 22>[Production of Toner (T-1)]

To 85 parts of the toner binder (D-1) were added 6 parts of carbon black MA-100 [available from Mitsubishi Chemical Corporation] as a pigment, 4 parts of carnauba wax as a release agent, and 4 parts of charge controlling agent "T-77" [available from Hodogaya Chemical Co., Ltd.] to produce a toner by the following method.

First, the components were pre-mixed using a Henschel mixer [FM10B available from Nippon Coke and Engineering Co., Ltd.], and then kneaded by a twin screw kneader [PCM-30 available from Ikegai Corporation]. Subsequently, after the kneaded mixture was finely ground using a supersonic jet grinder "Labo Jet" [available from Nippon Pneumatic Mfg. Co., Ltd.], the resultant particles were classified by an airflow classifier [MDS-I available from Nippon Pneumatic Mfg. Co., Ltd.]. Thus, toner particles having a volume average particle diameter D50 of 8 μm were obtained.

Subsequently, 1 part of colloidal silica (Aerosil R972 available from Nippon Aerosil Co., Ltd.) as a fluidizer was added to 100 parts of the toner particles and mixed in a sample mill. Thus, the toner (T-1) of the present invention was obtained.

<Examples 23 to 42>[Production of Toners (T-2) to (T-21)]

In each example, the raw materials in parts by weight according to Table 4 were used to produce a toner in the same manner as in Example 22. Thus, the toners (T-2) to (T-21) of the present invention were obtained.

TABLE 4

| | | | Ex. 22 | Ex. 23 | Ex. 24 | Ex. 25 | Ex. 26 | Ex. 27 | Ex. 28 | Ex. 29 | Ex. 30 | Ex. 31 | Ex. 32 | Ex. 33 | Ex. 34 |
|---|---|---|---|---|---|---|---|---|---|---|---|---|---|---|---|
| | | | (T-1) | (T-2) | (T-3) | (T-4) | (T-5) | (T-6) | (T-7) | (T-8) | (T-9) | (T-10) | (T-11) | (T-12) | (T-13) |
| | | | | | | | | | Toner binder (D) | | | | | | |
| | | | (D-1) | (D-2) | (D-3) | (D-4) | (D-5) | (D-6) | (D-7) | (D-8) | (D-9) | (D-10) | (D-11) | (D-12) | (D-13) |
| Toner (T) | Composition (parts by weight) Toner binder | (D-1) | 85 | — | — | — | — | — | — | — | — | — | — | — | — |
| | | (D-2) | — | 85 | — | — | — | — | — | — | — | — | — | — | — |
| | | (D-3) | — | — | 85 | — | — | — | — | — | — | — | — | — | — |
| | | (D-4) | — | — | — | 85 | — | — | — | — | — | — | — | — | — |
| | | (D-5) | — | — | — | — | 85 | — | — | — | — | — | — | — | — |
| | | (D-6) | — | — | — | — | — | 85 | — | — | — | — | — | — | — |
| | | (D-7) | — | — | — | — | — | — | 85 | — | — | — | — | — | — |
| | | (D-8) | — | — | — | — | — | — | — | 85 | — | — | — | — | — |
| | | (D-9) | — | — | — | — | — | — | — | — | 85 | — | — | — | — |
| | | (D-10) | — | — | — | — | — | — | — | — | — | 85 | — | — | — |
| | | (D-11) | — | — | — | — | — | — | — | — | — | — | 85 | — | — |
| | | (D-12) | — | — | — | — | — | — | — | — | — | — | — | 85 | — |
| | | (D-13) | — | — | — | — | — | — | — | — | — | — | — | — | 85 |
| | | (D-14) | — | — | — | — | — | — | — | — | — | — | — | — | — |
| | | (D-15) | — | — | — | — | — | — | — | — | — | — | — | — | — |
| | | (D-16) | — | — | — | — | — | — | — | — | — | — | — | — | — |
| | | (D-17) | — | — | — | — | — | — | — | — | — | — | — | — | — |
| | | (D-18) | — | — | — | — | — | — | — | — | — | — | — | — | — |
| | | (D-19) | — | — | — | — | — | — | — | — | — | — | — | — | — |
| | | (D-20) | — | — | — | — | — | — | — | — | — | — | — | — | — |
| | | (D-21) | — | — | — | — | — | — | — | — | — | — | — | — | — |
| | | (D'-1) | — | — | — | — | — | — | — | — | — | — | — | — | — |
| | | (D'-2) | — | — | — | — | — | — | — | — | — | — | — | — | — |
| | | (D'-3) | — | — | — | — | — | — | — | — | — | — | — | — | — |
| | Pigment | Carbon black | 6 | 6 | 6 | 6 | 6 | 6 | 6 | 6 | 6 | 6 | 6 | 6 | 6 |
| | Charge controlling agent | T-77 | 4 | 4 | 4 | 4 | 4 | 4 | 4 | 4 | 4 | 4 | 4 | 4 | 4 |
| | Release agent | Carnauba wax | 4 | 4 | 4 | 4 | 4 | 4 | 4 | 4 | 4 | 4 | 4 | 4 | 4 |
| | Fluidizer | Aerosil R972 | 1 | 1 | 1 | 1 | 1 | 1 | 1 | 1 | 1 | 1 | 1 | 1 | 1 |
| Resulting properties | Gloss degree (%) | | 20 | 25 | 30 | 22 | 28 | 26 | 28 | 26 | 23 | 24 | 40 | 35 | 34 |
| | Hot offset occurrence temperature (° C.) | | 200 | 200 | 180 | 200 | 190 | 190 | 180 | 190 | 180 | 180 | 180 | 180 | 200 |
| | Cold offset occurrence temperature (° C.) | | 125 | 115 | 120 | 125 | 125 | 125 | 125 | 125 | 110 | 105 | 100 | 110 | 100 |
| | Heat-resistant storage stability | | A | A | A | A | A | A | A | A | A | A | A | A | A |
| | Electrostatic charge stability | | A | A | A | A | A | A | A | A | A | A | A | A | A |
| | Grindability | | A | A | A | A | A | A | A | A | A | A | A | A | A |
| | Image strength | | A | A | A | A | A | A | A | A | A | A | A | A | A |

TABLE 4-continued

| | | | Ex. 35 | Ex. 36 | Ex. 37 | Ex. 38 | Ex. 39 | Ex. 40 | Ex. 41 | Ex. 42 | Com. Ex. 4 | Com. Ex. 5 | Com. Ex. 6 |
|---|---|---|---|---|---|---|---|---|---|---|---|---|---|
| Toner (T) | | | (T-14) | (T-15) | (T-16) | (T-17) | (T-18) | (T-19) | (T-20) | (T-21) | (T-1) | (T-2) | (T-3) |
| | Composition (parts by weight) | Toner binder | (D-14) | (D-15) | (D-16) | (D-17) | (D-18) | (D-19) Toner binder (D) | (D-20) | (D-21) | (D'-1) | (D'-2) | (D'-3) |
| | | (D-1) | — | — | — | — | — | — | — | — | — | — | — |
| | | (D-2) | — | — | — | — | — | — | — | — | — | — | — |
| | | (D-3) | — | — | — | — | — | — | — | — | — | — | — |
| | | (D-4) | — | — | — | — | — | — | — | — | — | — | — |
| | | (D-5) | — | — | — | — | — | — | — | — | — | — | — |
| | | (D-6) | — | — | — | — | — | — | — | — | — | — | — |
| | | (D-7) | — | — | — | — | — | — | — | — | — | — | — |
| | | (D-8) | — | — | — | — | — | — | — | — | — | — | — |
| | | (D-9) | — | — | — | — | — | — | — | — | — | — | — |
| | | (D-10) | — | — | — | — | — | — | — | — | — | — | — |
| | | (D-11) | — | — | — | — | — | — | — | — | — | — | — |
| | | (D-12) | — | — | — | — | — | — | — | — | — | — | — |
| | | (D-13) | — | — | — | — | — | — | — | — | — | — | — |
| | | (D-14) | 85 | — | — | — | — | — | — | — | — | — | — |
| | | (D-15) | — | 85 | — | — | — | — | — | — | — | — | — |
| | | (D-16) | — | — | 85 | — | — | — | — | — | — | — | — |
| | | (D-17) | — | — | — | 85 | — | — | — | — | — | — | — |
| | | (D-18) | — | — | — | — | 85 | — | — | — | — | — | — |
| | | (D-19) | — | — | — | — | — | 85 | — | — | — | — | — |
| | | (D-20) | — | — | — | — | — | — | 85 | — | — | — | — |
| | | (D-21) | — | — | — | — | — | — | — | 85 | — | — | — |
| | | (D'-1) | — | — | — | — | — | — | — | — | 85 | — | — |
| | | (D'-2) | — | — | — | — | — | — | — | — | — | 85 | — |
| | | (D'-3) | — | — | — | — | — | — | — | — | — | — | 85 |
| | Pigment | Carbon black | 6 | 6 | 6 | 6 | 6 | 6 | 6 | 6 | 6 | 6 | 6 |
| | Charge controlling agent | T-77 | 4 | 4 | 4 | 4 | 4 | 4 | 4 | 4 | 4 | 4 | 4 |
| | Release agent | Carnauba wax | 4 | 4 | 4 | 4 | 4 | 4 | 4 | 4 | 4 | 4 | 4 |
| | Fluidizer | Aerosil R972 | 1 | 1 | 1 | 1 | 1 | 1 | 1 | 1 | 1 | 1 | 1 |
| Resulting properties | Gloss degree (%) | | 32 | 31 | 37 | 45 | 36 | 41 | 43 | 40 | 20 | 2 | 20 |
| | Hot offset occurrence temperature (° C.) | | 200 | 200 | 210 | 180 | 200 | 180 | 180 | 180 | 130 | 230 | 120 |
| | Cold offset occurrence temperature (° C.) | | 105 | 105 | 110 | 105 | 110 | 110 | 105 | 110 | 120 | 170 | 115 |
| | Heat-resistant storage stability | | A | A | A | A | A | A | A | A | C | A | C |
| | Electrostatic charge stability | | A | A | A | A | A | A | A | A | A | B | A |
| | Grindability | | A | A | A | A | A | A | A | A | A | A | B |
| | Image strength | | A | A | A | A | A | A | A | A | C | A | C |

<Comparative Examples 4 to 6>[Production of Toners (T'-1) to (T'-3)]

In each example, the raw materials in parts by weight according to Table 4 were used to produce a toner in the same manner as in Example 22. Thus, the toners (T'-1) to (T'-3) were obtained.

[Evaluation Methods]

The following describes measurement methods, evaluation methods, and criteria for testing of the each obtained toner for low-temperature fixability, glossiness, hot offset resistance, heat-resistant storage stability, electrostatic charge stability, grindability, and image strength.

<Low-Temperature Fixability (Cold Offset Occurrence Temperature)>

The toner was uniformly placed on paper to a ratio of 1.00 mg/cm$^2$. At this point, the powder was placed on the paper using a printer with its thermal fixing device removed. Any method may be used as long as the powder can be uniformly placed in the above ratio.

This paper was passed between a soft roller and a heating roller at a fixing rate (peripheral speed of the heating roller) of 213 mm/sec with the heating roller temperature in increments of 5° C. in the range of 100° C. to 230° C.

Then, the toner-fixed image was visually observed for occurrence of cold offset, and the cold offset occurrence temperature (MFT) was measured.

A lower cold offset occurrence temperature indicates better low-temperature fixability.

Under the above evaluation conditions, usually, a lower cold offset occurrence temperature of 125° C. or lower is preferred.

<Glossiness>

The toner was placed on paper and fixed to the paper by the same method as described above for the low-temperature fixability.

Then, thick white paper was placed under the toner-fixed paper, and the gloss degree (%) of the printed image was measured at an incident angle of 60 degrees using a glossmeter ("IG-330" available from Horiba, Ltd.) for each increment of 5° C. in the range of the cold offset occurrence temperature (MFT) to a hot offset occurrence temperature. The highest gloss degree (%) in the range is used as an index of the glossiness of the toner.

For example, when the gloss degree is 10% at 120° C., 15% at 125° C., 20% at 130° C., and 18% at 135° C., the highest gloss degree is 20% at 130° C. Thus, the gloss degree of 20% is used as an index.

A higher gloss degree indicates better glossiness. Under the above evaluation conditions, usually, a gloss degree of 20% or higher is preferred.

<Hot Offset Resistance (Hot Offset Occurrence Temperature)>

By the same method as described above for the low-temperature fixability, the toner was placed on paper passed between a soft roller and a heating roller at a fixing rate (peripheral speed of the heating roller) of 213 mm/sec with the heating roller temperature in increments of 5° C. in the range of 100° C. to 230° C.

Then, the toner-fixed image was visually observed for occurrence of hot offset, and the hot offset occurrence temperature was measured.

A higher hot offset occurrence temperature indicates better hot offset resistance. Under the above evaluation conditions, usually, a hot offset occurrence temperature of 180° C. or higher is preferred.

<Heat-Resistant Storage Stability>

The toner (1 g) was placed in an airtight container and left to stand in an atmosphere of 50° C. and a humidity of 50% for 24 hours. The degree of blocking was visually observed, and the heat-resistant storage stability was evaluated according to the following criteria.

[Criteria]
A: No blocking occurred.
B: Blocking occurred partially.
C: Blocking occurred entirely.

<Electrostatic Charge Stability>

(1) A 50-ml glass jar was charged with 0.5 g of the toner and 20 g of a ferrite carrier (F-150 available from Powdertech Co., Ltd.). The temperature and the relative humidity inside the glass jar were controlled at 23° C. and 50% for at least eight hours.

(2) The glass jar was friction-stirred at 50 rpm for 10 minutes and for 60 minutes by a Turbula shaker-mixer. The electrostatic charge level was measured for each time period.

A blow-off electrostatic charge level measurement device [available from Kyocera Chemical Corporation] was used for the measurement.

A value of "electrostatic charge level after a friction time of 60 minutes/electrostatic charge level after a friction time of 10 minutes" was calculated to obtain an index of the electrostatic charge stability.

[Criteria]
A: 0.7 or more
B: 0.6 or more and less than 0.7
C: Less than 0.6

<Grindability>

After kneading by a twin screw kneader, cooling, and coarsely groundinging, the resultant coarse particles of the toner (8.6 mesh pass to 30 mesh on) were finely ground by a supersonic jet mill (Labojet available from Nippon Pneumatic Mfg. Co., Ltd.) under the following conditions.

Grinding pressure: 0.5 MPa
Grinding time: 10 min
Adjuster ring: 15 mm
Louver size: medium Without classification, these particles were measured for the volume average particle size (μm) by a Coulter counter "TAII" (U.S. Coulter Electronics Ltd.). The grindability was evaluated according to the following criteria.

[Criteria]
A: Less than 10 μm
B: 10 μm or more and less than 12 μm
C: 12 μm or more <Image Strength>

An image fixed for evaluation of the low-temperature fixability was subjected to a scratch test under a load of 10 g that was applied to a pencil fixed at an inclination of 45 degrees from directly above the pencil according to JIS K 5600. The image strength was evaluated based on the hardness of the pencil that did not scratch the image. A higher pencil hardness indicates better image strength. Generally, a hardness of HB or higher is preferred.

[Criteria]
A: HB or higher
B: B
C: 2B or lower

As is clear from the evaluation results shown in Table 4, the toners (T-1) to (T-21) in Examples 22 to 42 of the present invention exhibited excellent results in all the properties.

In contrast, the toners in Comparative Example 4, Comparative Example 5, and Comparative Example 6 exhibited poor results in some properties. The toner binder used in Comparative Example 5 had a tan δ of less than 2 at 110° C., 120° C., and 130° C. In contrast, the toner binder used in Comparative Example 6 had a tan δ of more than 20 at 130° C.

INDUSTRIAL APPLICABILITY

The toner binder and the toner of the present invention exhibit offset resistance and can provide high gloss for a toner image, which are excellent in low-temperature fixability, grindability, image strength, and heat-resistant storage stability. The toner binder and the toner are suitably applicable as a toner binder and a toner for developing electrostatic images in processes such as electrographic printing, electrostatic recording, and electrostatic printing.

The toner binder and the toner are also suitably applicable as additives for coating materials, additives for adhesives, and particles for electronic paper.

The invention claimed is:

1. A toner binder comprising:
a non-linear polyester modified resin (A),
wherein the non-linear polyester modified resin (A) is a modified resin having one or more carbon-carbon bonds crosslinking polyesters,
wherein the toner binder has a loss tangent tan δ of 2 to 20 in the entire temperature range of 110° C. to 130° C.,
wherein the polyester comprises a polyester (A1) having carbon-carbon double bonds, and the polyester (A1) having carbon-carbon double bonds has a glass transition temperature $Tg_{A1}$ of −35° C. to 43° C.

2. The toner binder according to claim 1,
wherein the polyester (A1) having carbon-carbon double bonds contains an unsaturated carboxylic acid component (y) and/or an unsaturated alcohol component (z) as a raw material.

3. The toner binder according to claim 1,
wherein the toner binder has a double bond equivalent of 0.50 mmol/g or less.

4. The toner binder according to claim 1,
wherein the polyester (A1) having carbon-carbon double bonds has a double bond equivalent of 0.02 to 2.00 mmol/g.

5. The toner binder according to claim 1,
wherein at least one of the carbon-carbon bonds is a carbon-carbon bond formed by mutually crosslinking carbon-carbon double bonds derived from the polyester (A1) having carbon-carbon double bonds.

6. The toner binder according to claim 1,
wherein the polyester (A1) having carbon-carbon double bonds has a peak top molecular weight Mp of 2,000 to 30,000.

7. The toner binder according to claim 1, further comprising a polyester (B) containing a saturated carboxylic acid component and a saturated alcohol component as raw materials.

8. The toner binder according to claim 7,
wherein the polyester (A1) having carbon-carbon double bonds and the polyester (B) are contained at a weight ratio (A1)/(B) of 5/95 to 50/50.

9. The toner binder according to claim 7,
wherein the non-linear polyester modified resin (A) is a modified resin produced by mutually crosslinking carbon-carbon double bonds derived from the polyester (A1) having carbon-carbon double bonds in a state where the polyester (A1) having carbon-carbon double bonds and the polyester (B) are mixed together.

10. The toner binder according to claim 7,
wherein the non-linear polyester modified resin (A) is a modified resin produced by mutually crosslinking carbon-carbon double bonds derived from the polyester (A1) having carbon-carbon double bonds using a radical reaction initiator (c) in a state where the polyester (A1) having carbon-carbon double bonds and the polyester (B) are mixed together.

11. The toner binder according to claim 1,
wherein the toner binder has a storage modulus (G') at 120° C. of 30 to 35,000 Pa and a loss modulus (G") at 120° C. of 60 to 70,000 Pa.

12. The toner binder according to claim 1, further comprising tetrahydrofuran (THF) insolubles,
wherein the amount of the tetrahydrofuran (THF) insolubles in the toner binder is 20% by weight or less.

13. The toner binder according to claim 1, further comprising a crystalline resin (C) other than the polyester (A1) having carbon-carbon double bonds and a polyester (B) containing a saturated carboxylic acid component and a saturated alcohol component as raw materials.

14. The toner binder according to claim 1,
wherein the toner binder has at least one inflexion point indicating a glass transition temperature $Tg_T$ in a temperature range of −20° C. to 80° C. in a chart obtained by differential scanning calorimetry (DSC) using the toner binder.

15. A toner comprising:
the toner binder according to claim 1; and
a colorant.

* * * * *